United States Patent

Gutknecht et al.

[11] Patent Number: 5,891,407
[45] Date of Patent: Apr. 6, 1999

[54] PROCESS FOR PRODUCING PURE AMMONIUM METALLATES

[75] Inventors: Wilfried Gutknecht, Goslar; Wolfgang Mathy, Langelsheim, both of Germany

[73] Assignee: H.C. Starck GmbH & Co. KG, Goslar, Germany

[21] Appl. No.: 973,351

[22] PCT Filed: May 30, 1996

[86] PCT No.: PCT/EP96/02318

§ 371 Date: Dec. 4, 1997

§ 102(e) Date: Dec. 4, 1997

[87] PCT Pub. No.: WO96/41767

PCT Pub. Date: Dec. 27, 1996

[51] Int. Cl.$^6$ ............... C01G 47/00; C01G 37/00; C01G 39/00; C01G 41/00

[52] U.S. Cl. ............... 423/49; 423/54; 423/63; 423/593

[58] Field of Search ............... 423/49, 54, 63, 423/53, 56, 62, 67, 593, 595

[56] References Cited

U.S. PATENT DOCUMENTS

| | | | |
|---|---|---|---|
| 4,051,221 | 9/1977 | Pannekeet et al. | 423/54 |
| 4,079,116 | 3/1978 | Ronzio et al. | 423/54 |
| 4,279,869 | 7/1981 | Coulson | 423/54 |

FOREIGN PATENT DOCUMENTS

| | | | |
|---|---|---|---|
| 661678 | 7/1965 | Belgium . | |
| 308 521 | 3/1989 | European Pat. Off. . | |
| 308521 | 3/1989 | European Pat. Off. . | |
| 54-115696 | 9/1979 | Japan | 423/63 |
| 1032810 | 9/1986 | U.S.S.R. | 423/54 |
| PCT/EP96/ 023181 | 5/1996 | WIPO . | |

OTHER PUBLICATIONS

Ullmanns, Encyklopä die der technischen Chemie, Band 24, p. 466, no date.

Uranium Mining and Metallurgy, vol. 10, No. 3, Aug. 1991, pp. 39–47.

Patents Abstracts of Japan, C–37, Dec. 26, 1980, vol. 4, No. 190 Recovering Molybdenum from Water Containing the Same.

6001 Chemical Abstracts, 110:60551e (1989), Feb. 20, No. 8, Columbus, Ohio "Preparation of ammonium paratungstate with high–purity using two–step ion exchange method", no month.

Derwent Chemical Patent Index, *MEEN, M25, 94–133033/16, SU1792993–A1, "Extn. of tungsten from carbonate solns. with improved efficiency", Mosc. Mendeleev Chem Techn Inst Feb. 15, 1991.

Derwent Chemical Patent Index, *MEEN, M25, 94–133034/16, SU1792994–A1, "Extn. of tungsten from carbonate solns. includes extn. with salt of quat. ammonium base in organic diluent to improve process efficiency", Mosc. Mendeleev Chem Techn Inst Mar. 15, 1991.

Derwent, 87–133959[19], "Extn. of rare metals from solns.—using exchange resin regenerate anionite washing solution adjust total ammonia level sodium", Khabirov, V, SU1032810A.

Zhu, Yujun, "Extraction of ammonium paratungstate by ion exchange", Beijing Res. Inst. Chem. Eng. Metall., CNNC, Beijing, Pweop. Rep. China, Youkuangye (1991), 10(3), 39–47, no month.

*Primary Examiner*—Steven Bos
*Attorney, Agent, or Firm*—Jerry Cohen

[57] ABSTRACT

The present invention relates to a process for the production of pure ammonium metallates of the metals W, Mo, V, Cr and Re, wherein alkaline metal salt solutions are adjusted to a pH value in the range from 5 to 9 by reaction with $CO_2$, these metal salt solutions are passed through an anion exchanger in carbonate form, wherein, in addition to the alkali metal carbonate solution, the metallate form of the ion exchanger is formed, the ion exchanger is then washed until free of alkali and is then eluted by means of aqueous ammonia to form ammonium metallate solutions and the anion exchanger in the OH form, wherein the anion exchanger is converted into the carbonate form by means of $CO_2$ treatment and is recycled.

10 Claims, No Drawings

PROCESS FOR PRODUCING PURE AMMONIUM METALLATES

The present invention relates to a process for the production of pure ammonium metallates of the metals W, Mo, V, Cr and Re, wherein alkaline metal salt solutions are adjusted to a pH value in the range from 5 to 9 by reaction with $CO_2$, these metal salt solutions are passed through an anion exchanger in carbonate form, wherein, in addition to the alkaline metal carbonate solution, the metallate form of the ion exchanger is formed, the ion exchanger is then washed until free of alkali and is then eluted by means of aqueous ammonia to form ammonium metallate solutions and the anion exchanger in the OH form, wherein the anion exchanger is converted into the carbonate form by means of $CO_2$ treatment and is recycled.

In order to produce pure ammonium metallates, in particular of the refractory metals W, Mo and V as precursors for recovery of the metals, the raw materials are generally treated with alkaline NaOH or $Na_2CO_3$ solutions. An excess of alkali is used in this operation in order to achieve the greatest possible yields of the valuable metal. In the subsequent processing stage, the pH value of these solutions must be reduced. Since this is generally achieved by using mineral acids, this inevitably results in the formation of neutral salts, which must be disposed of.

Once the alkaline metallate solutions obtained in this manner have been digested and purified, they are converted into the ammonium metallates.

This is principally achieved by solvent extraction processes (*Ulmanns Encyclopädie der technischen Chemie*, 4th edition, volume 24, 1983, page 466) or recovery using solid ion exchangers (*Uranium Mining and Metallurgy*, volume 10(3), August 1991).

The reduction in pH is also achieved in these two processes by the addition of mineral acids, inevitably resulting in the formation of considerable quantities of neutral salts which must be disposed of.

An improved solvent extraction process is disclosed in SU-A 1 792 993 and SU-A 1 792 994 (Derwent 94-133033/16 and 94-133084/16). According to this process, acidification is performed with $CO_2$, resulting in the formation of $Na_2CO_3$, which may be returned to the process. In the process described, the metallate anion is converted into an organic phase and then only partially re-extracted with $NH_3$ solution. However, up to approx. 50% of the stoichiometric quantity of the extracting agent remain blocked by the metallate anion.

The object of the present invention is to provide a process which avoids environmental pollution by the neutral salts and the disadvantages of incomplete utilisation of the extracting agent.

This object is achieved by a process for the production of pure ammonium metallates of the metals W, Mo, V, Cr and Re, wherein alkaline metal salt solutions are adjusted to a pH value in the range from 5 to 9 by reaction with $CO_2$, these metal salt solutions are passed through an anion exchanger in carbonate form, wherein, in addition to the alkaline metal carbonate solution, the metallate form of the ion exchanger is formed, the ion exchanger is then washed until free of alkali and is then eluted by means of aqueous ammonia to form ammonium metallate solutions and the anion exchanger in the OH form, wherein the anion exchanger is converted into the carbonate form by means of $CO_2$ treatment and is recycled, wherein the anion exchanger used is a solid anion exchanger.

The solid anion exchanger used is preferably a moderately basic ion exchanger. These are those ion exchangers which contain tertiary and quaternary ammonium groups as the active components. Better results are achieved with weakly basic ion exchangers, i.e. those predominantly containing tertiary ammonium groups as the active components. These may be almost completely eluted with aqueous $NH_3$.

The best results are achieved if the alkaline metal salt solutions are reacted with $CO_2$ at pressures ranging from standard pressure to 50 bar, preferably from standard pressure to 10 bar.

The exchanger may also advantageously be laden with $CO_2$ by means of $CO_2$/water at pressures of 1 to 10 bar. In this manner, it is simple to convert fixed bed exchangers in particular into the carbonate form.

Elution of the anion exchanger by means of aqueous ammonia is preferably performed with a concentration of 5 to 20 wt. % of $NH_3$ up to a degree of exchange of at least 90%.

A particularly advantageous variant of the process according to the invention consists in concentrating the raffinate containing the alkaline metal carbonate, recycling it and using it to digest metal raw materials for the production of the alkaline metal salt solutions.

The course of the process is illustrated below using tungsten by way of example, but this should not be considered to limit it in any way.

The sodium alkaline digestion solution is treated with gaseous $CO_2$ until a pH value of 8.5 is reached. P, As and Si impurities are separated at this pH using known precipitation processes. After the subsequent filtration, the solution is diluted to 20 to 50 g of $WO_3$/l and adjusted to a pH value of approx. 7 with $CO_2$.

The exchanger plant, which comprises two or more columns, is filled with a moderately to weakly basic anion exchanger. The exchanger resin is converted into the $CO_3^{2-}$ form by an aqueous suspension with $CO_2$, preferably under pressure. The adjusted tungstate solution passes through the exchanger columns in succession. The pH value is readjusted between the individual columns by addition of $CO_2$. A solution containing 15 g of $Na_2CO_3$/l leaves the final column. Once the first column is laden with $WO_4^{2-}$, the column is washed with $H_2O$ until free of sodium, eluted with dilute $NH_3$ solution at temperatures of 50° to 80° C., rewashed, reformed with $CO_2$ and switched to the end of the plant. The eluate may be worked up using known processes.

Compared with solvent extraction, the process according to the invention may be performed using simpler plant and equipment and is easier to control.

The invention is illustrated below by way of example, but this should not be considered to limit it in any way.

EXAMPLE 1 (Comparative Example according to SU-A 1792993/4)

Continuous extraction of W using $CO_2$ to establish the required pH value was investigated using a laboratory SX plant (mixer/settler).

The $Na_2WO_4$ solution used was diluted to 70 g/l of W and treated with gaseous $CO_2$ until a pH value of 7.0 was established. The organic phase (15% Adogen 464, 8% isodecanol, remainder Escaid 120), which was circulated, was also treated with gaseous $CO_2$ in the storage vessel.

Once the organic phase (OP) was laden with 35 to 40 g/l of W, approx. 55% of the W loading could be stripped with $NH_3$ solution. The remaining 45% remained on the circulating OP or could only be isolated with NaOH as an $Na_2WO_4$ strip.

EXAMPLE 2 (according to the invention)

Various weakly, moderately and strongly basic anion exchangers were tested in order to determine the optimum anion exchanger for recovery of ammonium paratungstate (APT). All the exchangers were completely laden with excess $Na_2WO_4$ solution, the excess $Na_2WO_4$ was washed out and the bound $WO_4^{2-}$ eluted with 10% $NH_3$ solution. Only the weakly basic anion exchangers were completely elutable. In the case of the moderately basic anion exchangers, 10 to 20% of the W loading remains on the anion exchanger, depending upon the content of quaternary ammonium groups. In the case of the strongly basic anion exchangers containing only quaternary ammonium groups, only less than 1% to 45% of the W loading could be eluted with $NH_3$ solution. The remaining $WO_4^{2-}$ could only be eluted with NaOH.

The test conditions for Example 2 are shown in the following table.

| Anion exchanger | Basicity | Delivery form | pH loading | $NH_4$ eluate g/l of W | Capacity g/l of W of exchanger |
|---|---|---|---|---|---|
| Lewatit[1] AP 29 | moderate | OH | 8 | 13.5 | 135 |
| Lewatit AP 246 | weak | OH | 8 | 12.9 | 129 |
| Lewatit MP 62 | weak | OH | 8.5 | 18.7 | 187 |
| Lewatit MP 64 | moderate | OH | 8.5 | 16.4 | 164 |
| Lewatit MP 500 | strong | Cl | 8.5 | 3.35 | 33.5 |
| Lewatit MP 600 | strong | Cl | 8.5 | 7.6 | 76 |
| Lewatit M 500 | strong | Cl | 8 | 0.08 | 0.8 |
| Lewatit M 504 | strong | Cl | 8 | 0.35 | 3.5 |
| Lewatit M 600 | strong | Cl | 8 | 0.145 | 1.45 |

[1] Commercial product of Bayer AG, Leverkusen, Germany

EXAMPLE 3

Loading tests with various refractory metals were performed using the weakly basic exchanger Lewatit MP 62, which according to table 1 exhibits the highest loading capacity elutable with ammonia solution. The exchanger was formed with $CO_2$ at standard pressure. Loading was performed in each case with identical quantities, calculated as W, relative to a 20 g/l sodium tungstate solution. Elution was performed with a 1:1 diluted aqueous $NH_3$ solution.

The results are shown in table 2 below.

TABLE 2

| Metal | pH | Loading |
|---|---|---|
| W | 7 | 153.5 g of W/l of exchanger |
| Mo | 6–6.5 | 51.2 g of Mo/l of exchanger |
| Cr | 6–6.5 | 40 of Cr/l of exchanger |
| V | 7 | 75.7 g of V/l of exchanger |
| Re | 7 | 107 g of Re/l of exchanger |

Absorption capacity could be raised by 20% by treating the exchanger Lewatit MP 62 with gaseous $CO_2$ at 10 bar in comparison with gaseous $CO_2$ treatment at standard pressure.

We claim:

1. Process for production of pure ammonium metallates of a metal selected from the group consisting of W, Mo, V, Cr and Re, comprising the steps of:
   (a) providing an alkaline metal salt solution of the metal,
   (b) reacting the solution with $CO_2$ to adjust the pH of the solution within a range of 5 to 9,
   (c) contacting the pH adjusted solution with a carbonate form solid anion exchange material to produce a metallate form of the anion exchange material and an alkaline metal carbonate solution,
   (d) eluting the metallate form of the anion exchange material with aqueous ammonia to form (i) an ammonium metallate solution and (ii) an OH form of the anion exchange material,
   (e) separating the thus formed ammonium metallate solution and OH form anion exchange material and treating the OH form anion exchange material with $CO_2$ to convert it to a carbonate form and recycling the carbonate form anion exchange material to step (c) for use as the carbonate form solid anion exchange material of step (c).

2. Process according to claim 1, wherein the solid anion exchange material is a moderately basic ion exchanger.

3. Process according to claim 1, wherein the solid anion exchange material is a weakly basic ion exchanger predominantly containing tertiary ammonium groups.

4. Process according to any of claims 1, 2, and 3, wherein the reaction of the alkaline metal salt solutions with $CO_2$ is performed at pressures ranging from standard pressure to 50 bar.

5. Process according to claim 4, wherein the OH form anion exchange material is converted into the carbonate form with $CO_2$/water at pressures of 1 to 10 bar.

6. Process according to claim 5, wherein the metallate form of the anion exchange material is eluted with aqueous ammonia of a concentration of 5 to 20 wt. % $NH_3$ to a degree of exchange of at least 90%.

7. Process according to claim 6, wherein the alkali metal carbonate solution is concentrated, recycled and then metal raw materials are digested to produce the alkaline metal salt solution.

8. Process according to claim 4 wherein the metallate form of the anion exchange material is eluted with aqueous ammonia of a concentration of 5 to 20 wt. % $NH_3$ to a degree of exchange of at least 90%.

9. Process according to any of claims 1, 2, and 3 wherein the OH form anion exchange material is converted into carbonate form contacting with $CO_2$/water at pressures of 1 to 10 bar.

10. Process according to any of claims 1, 2, and 3 wherein the alkaline metal carbonate solution is concentrated and recycled and then metal containing raw materials are digested thereby to produce the alkaline metal salt solution.

* * * * *